United States Patent
Arimilli et al.

(10) Patent No.: US 6,343,347 B1
(45) Date of Patent: Jan. 29, 2002

(54) MULTIPROCESSOR SYSTEM BUS WITH CACHE STATE AND LRU SNOOP RESPONSES FOR READ/CASTOUT (RCO) ADDRESS TRANSACTION

(75) Inventors: Ravi Kumar Arimilli, Austin; John Steven Dodson, Pflugerville; Guy Lynn Guthrie; Jody B. Joyner, both of Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,224

(22) Filed: Aug. 4, 1999

(51) Int. Cl.⁷ .................................. G06F 12/08
(52) U.S. Cl. ................ 711/143; 711/144; 711/145; 711/146; 711/121; 711/122; 711/136
(58) Field of Search ................. 711/128, 122, 711/143, 144, 145, 146, 136, 121

(56) References Cited

U.S. PATENT DOCUMENTS

| | | | |
|---|---|---|---|
| 4,797,814 A | | 1/1989 | Brenza |
| 5,369,753 A | | 11/1994 | Tipley |
| 5,493,668 A | | 2/1996 | Elko et al. |
| 5,564,035 A | | 10/1996 | Lai |
| 5,636,355 A | * | 6/1997 | Ramakrishnan et al. .... 711/113 |
| 5,829,038 A | | 10/1998 | Merrell et al. |
| 5,829,040 A | | 10/1998 | Son |
| 5,895,495 A | | 4/1999 | Arimilli et al. |
| 5,946,709 A | | 8/1999 | Arimilli et al. |
| 5,966,729 A | | 10/1999 | Phelps |
| 6,018,791 A | | 1/2000 | Arimilli et al. |
| 6,021,468 A | | 2/2000 | Arimilli et al. |
| 6,023,747 A | * | 2/2000 | Dodson ...................... 711/141 |
| 6,029,204 A | | 2/2000 | Arimilli et al. |
| 6,058,456 A | | 5/2000 | Arimilli et al. |
| 6,195,729 B1 | | 2/2001 | Arimilli et al. |

OTHER PUBLICATIONS

Lebeck et al., Request combining in multiprocessors with arbitrary interconnection networks, IEEE digital library, vol. 5, No. 11, pp. 1140–1155, Nov. 1994.*
Texas Instruments Incorporated, TMS32010 User's Guide, 1983, 3 pages.
Handy, Jim; *The Cache Memory Book*; Academic Press, Inc.; 1993; pp. 77–82.

* cited by examiner

*Primary Examiner*—Hiep T. Nguyen
(74) *Attorney, Agent, or Firm*—Casimer K. Salys; Bracewell & Patterson, L.L.P.

(57) ABSTRACT

Upon snooping a combined data access and cast out/deallocate operation initiating by a horizontal storage device, snoop logic determines appropriate responses to both the data access and the cast out/deallocate based upon the presence and coherency state of the target of the data access within a corresponding storage device, the presence and coherency state of the victim of the cast out/deallocate within the corresponding storage device, and the presence of an invalid entry within the corresponding storage device in a congruence class including both the target and the victim. The appropriate responses are "merged", transmitted together in response to the combined operation as either a single response code or discrete response codes within a single response. The coherency state and LRU position of the selected victim for the cast out/deallocate portion of the combined operation may also be appended to the response to facilitate data storage management.

21 Claims, 6 Drawing Sheets

MULTIPROCESSOR SYSTEM BUS WITH CACHE STATE AND LRU SNOOP RESPONSES FOR READ/CASTOUT (RCO) ADDRESS TRANSACTION

RELATED APPLICATIONS

The present invention is related to the subject matter of commonly assigned, copending U.S. patent applications: Ser. No. 09/368,222 entitled "MULTIPROCESSOR SYSTEM BUS WITH READ/CASTOUT (RCO) ADDRESS TRANSACTION"; Ser. No. 09/368,221 entitled "SYSTEM BUS DIRECTORY SNOOPING MECHANISM FOR READ/CASTOUT (RCO) ADDRESS TRANSACTION"; Ser. No. 09/368,225 entitled "PRECISE INCLUSIVITY MECHANISM FOR SYSTEM BUS WITH READ/DEALLOCATE (RDA) ADDRESS TRANSACTION"; Ser. No. 09/368,223 entitled "UPGRADING OF SNOOPER CACHE STATE MECHANISM FOR SYSTEM BUS WITH READ/CASTOUT (RCO) ADDRESS TRANSACTIONS"; Ser. No. 09/368,227 now U.S. Pat. No. 6,279,086, entitled "MULTIPROCESSOR SYSTEM BUS WITH COMBINED SNOOP RESPONSES IMPLICITLY UPDATING SNOOPER LRU POSITION"; Ser. No. 09/368,226 now U.S. Pat. No. 6,275,909 entitled "MULTIPROCESSOR SYSTEM BUS WITH SYSTEM CONTROLLER EXPLICITLY UPDATING SNOOPER CACHE STATE INFORMATION"; Ser. No. 09/368,229 entitled "MULTIPROCESSOR SYSTEM BUS WITH SYSTEM CONTROLLER EXPLICITLY UPDATING SNOOPER LRU INFORMATION"; Ser. No. 09/368,228 entitled "MULTIPROCESSOR SYSTEM BUS WITH COMBINED SNOOP RESPONSES EXPLICITLY CANCELLING MASTER VICTIM SYSTEM BUS TRANSACTION"; Ser. No. 09/368,230 entitled "MULTIPROCESSOR SYSTEM BUS WITH COMBINED SNOOP RESPONSES EXPLICITLY CANCELLING MASTER ALLOCATION OF READ DATA"; and Ser. No. 09/368,231 entitled "MULTIPROCESSOR SYSTEM BUS WITH COMBINED SNOOP RESPONSES EXPLICITLY INFORMING SNOOPERS TO SCARF DATA". The content of the above-identified applications is incorporated herein by reference.

BACKGROUND OF THE INVENTION

1. Technical Field

The present invention relates in general to system responses to bus operations in data processing systems and in particular to system responses to related data access and cast out or deallocate operations. Still more particularly, the present invention relates to merged snoop responses to related data access and cast out or deallocate operations which include cache state, LRU position, and storage availability information for the snooper.

2. Description of the Related Art

High performance data processing systems typically include a number of levels of caching between the processor(s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

Within such systems, when data access operations frequently give rise to a need to make space for the subject data. For example, when retrieving data from lower storage levels such as system memory or lower level caches, a cache may need to overwrite other data already within the cache because no further unused space is available for the retrieved data. A replacement policy—typically a least-recently-used (LRU) replacement policy—is employed to decide which cache location(s) should be utilized to store the new data.

Often the cache location (commonly referred to as a "victim") to be overwritten contains only data which is invalid or otherwise unusable from the perspective of a memory coherency model being employed, or for which valid copies are concurrently stored in other devices within the system storage hierarchy. In such cases, the new data may be simply written to the cache location without regard to preserving the existing data at that location.

At other times, however, the cache location selected to received the new data contains modified data, or data which is otherwise unique or special within the storage hierarchy. In such instances, the replacement of data within a selected cache location (a process often referred to as "updating" the cache) requires that any modified data associated with the cache location selected by the replacement policy be written back to lower levels of the storage hierarchy for preservation. The process of writing modified data from a victim to system memory or a lower cache level is generally called a cast out or eviction.

When a cache initiates a data access operation—for instance, in response to a cache miss for a READ operation originating with a processor—typically the cache will initiate a data access operation (READ or WRITE) on a bus coupling the cache to lower storage levels. If the replacement policy requires that a modified cache line be overwritten, compelling a cast out for coherency purposes, the cache will also initiate the cast out bus operation.

Even when the selected victim contains data which is neither unique nor special within the storage hierarchy (i.e. invalid data), an operation to lower levels of the storage hierarchy may still be required. For instance, the cache organization may be "inclusive," meaning that logically vertical in-line caches contain a common data set. "Precise" inclusivity requires that lower level caches include at least all cache lines contained within a vertically in-line, higher level cache, although the lower level cache may include additional cache lines as well. Imprecise or "pseudo-precise" inclusivity relaxes this requirement, but still seeks to have as much of the data within the higher level cache copied within the lower level cache as possible within constraints imposed by bandwidth utilization tradeoffs. Within an inclusive, hierarchical cache system, even if the cache line to be replaced is in a coherency state (e.g., "shared") indicating that the data may be simple discarded without writing it to lower level storage, an operation to the lower level storage may be required to update inclusivity information. The storage device within which the cache line is to be overwritten (or "deallocated" and replaced) initiates an operation notifying lower level, in-line storage devices of the deallocation, so that the lower level devices may update internal inclusivity information associated with the cache line. This requires an operation in addition to the data access operation necessitating replacement of the cache line.

In addition to the data access and cast out/deallocate bus operations, snoop responses from horizontal storage devices (those at the same level within the storage hierarchy as the storage device initiating the data access and cast out/deallocate operations) are driven separately on the system bus. Furthermore, the snoop response is typically limited to only a coded response to the initiated data access or cast out/deallocate bus operation—that is, a null response indicating that the operation may proceed, a retry indicating that the operation should be deferred until the snooper completes an operation, an intervention indicating that the snooper will source requested data, or the like. Snoop responses conventionally allow an operation to proceed, stop the operation, or redirect the operation, but do not provide any additional information allowing the combined response logic or the storage device initiating the bus operation to intelligently react to the snoop response.

It would be desirable, therefore, to reduce the number of system bus responses required for related data access and cast out or deallocate bus operations. It would further be advantageous to improve the information driven within the snoop responses for improved storage management.

SUMMARY OF THE INVENTION

It is therefore one object of the present invention to provide improved system responses to bus operations in data processing systems.

It is another object of the present invention to provide improved system responses to related data access and cast out or deallocate operations in data processing systems.

It is yet another object of the present invention to provide merged snoop responses to related data access and cast out or deallocate operations which include cache state, LRU position, and storage availability information for the snooper.

The foregoing objects are achieved as is now described. Upon snooping a combined data access and cast out/deallocate operation initiating by a horizontal storage device, snoop logic determines appropriate responses to both the data access and the cast out/deallocate based upon the presence and coherency state of the target of the data access within a corresponding storage device, the presence and coherency state of the victim of the cast out/deallocate within the corresponding storage device, and the presence of an invalid entry within the corresponding storage device in a congruence class including both the target and the victim. The appropriate responses are "merged", transmitted together in response to the combined operation as either a single response code or discrete response codes within a single response. The coherency state and LRU position of the selected victim for the cast out/deallocate portion of the combined operation may also be appended to the response to facilitate data storage management.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
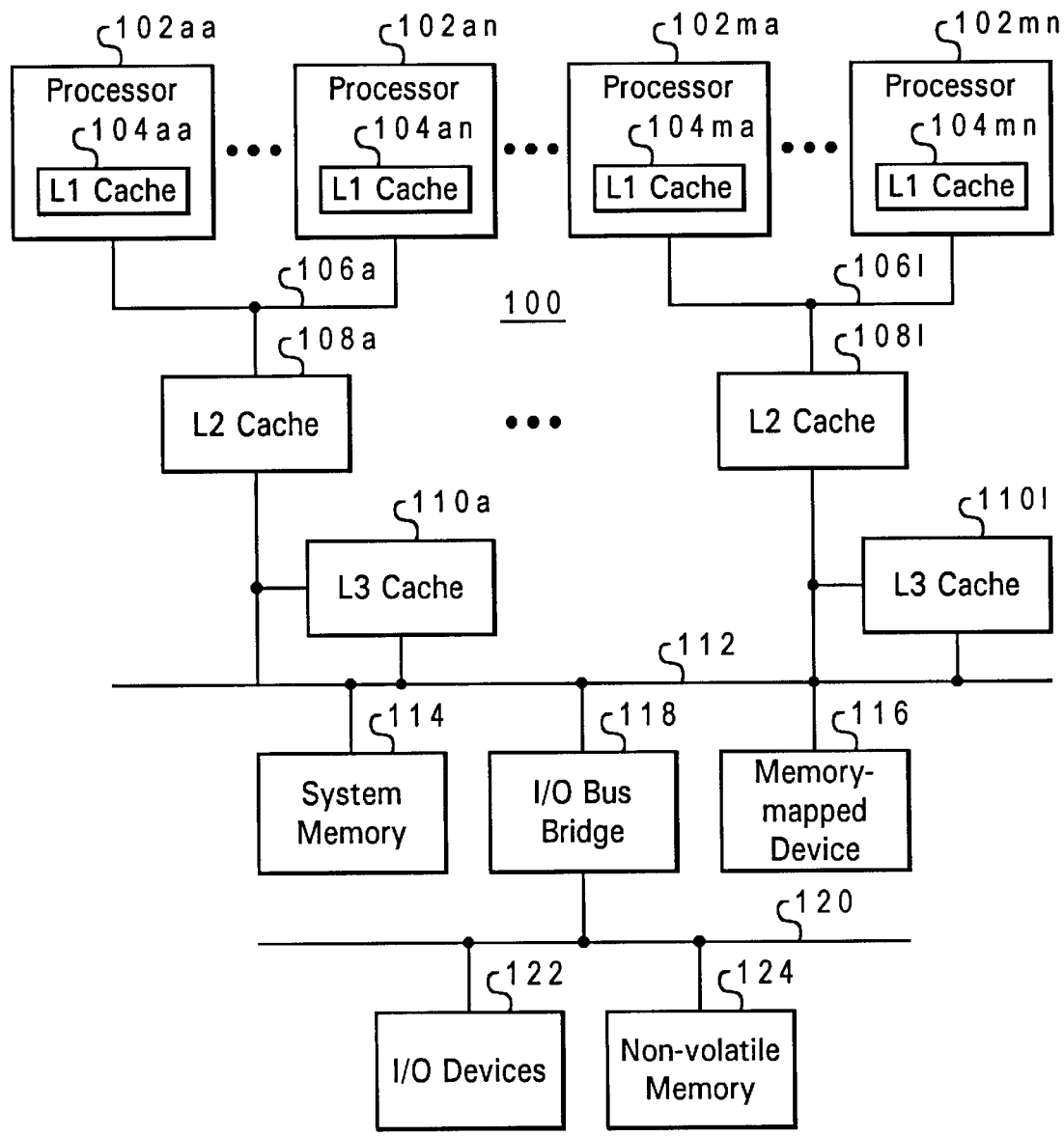
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102$aa$ through 102$a$n and 102$m$a through 102$mn$ (where "m"and "n" are integers). Each processor 102$aa$–102$mn$ includes a respective level one (L1) cache 104$aa$–104$mn$, preferably on chip with the processor and bifurcated into separate instruction and data caches. Each processor 102$aa$–102$mn$ is coupled via a processor bus 106$aa$–106$l$ to a level two cache 108$a$–108$l$ (where "l" is an integer), which are in-line caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108$a$–108$l$ is connected to a level three (L3) cache 110$a$–110$l$ and to system bus 112. L3 caches 110$a$–110$l$ are actually in-line caches rather than lookaside caches as FIG. 1 suggests, but operations received from a vertical L2 cache (e.g., L2 cache 108$a$) are initiated both within the L3 cache 110$a$ and on system bus 112 concurrently to reduce latency. If the operation produces a cache hit within the L3 cache 110$a$, the operation is cancelled or aborted on system bus 112. On the other hand, if the operation produces a cache miss within the L3 cache 110$a$, the operation is allowed to proceed on system bus 112.

The lower cache levels—L2 caches 108$a$–108$l$ and L3 caches 110$a$–110$l$—are employed to stage data to the L1 caches 104$a$–104$l$ and typically have progressively larger storage capacities but longer access latencies. L2 caches 108$a$–108$l$ and L3 caches 110$a$–110$l$ thus serve as intermediate storage between processors 102$a$–102$l$ and system memory 114, which typically has a much larger storage capacity but may have an access latency many times that of L3 caches 110$a$–110$l$. Both the number of levels in the cache hierarchy and the cache hierarchy configuration (i.e, shared versus private, in-line versus lookaside) employed in data processing system 100 may vary.

L2 caches 108$a$–108$l$ and L3 caches 110$a$–110$l$ are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2:
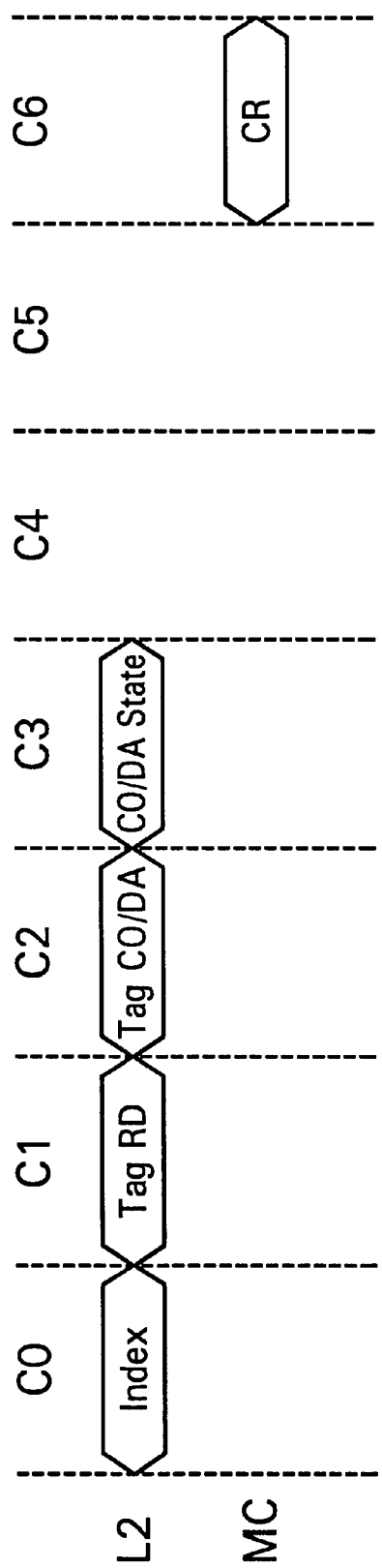
FIG. 2 is a timing diagram for a combined data access and related cast out/deallocate operation in accordance with a preferred embodiment of the present invention.

Referring to FIG. 2, a timing diagram for a combined data access and related cast out/deallocate operation in accordance with a preferred embodiment of the present invention is illustrated. In the exemplary embodiment, the combined operation is initiated on system bus 112 by an L2 cache 108a–108l in response to a cache miss for a data access operation within the L2 cache. However, the combined operation may be employed for transmission on any bus by any storage device requiring related data access and cast out/deallocate operations. Similarly, the data access operation is a READ in the exemplary embodiment, but may be any data access operation (e.g., WRITE, etc.).

When a cache miss occurs within the L2 cache for a data access operation, the cache controller for the L2 cache should be able to determine from the coherency state of the selected victim whether a cast out or deallocate operation will be required, either to preserve data within the cache location selected to be updated by the replacement policy or to update inclusivity information. Moreover, an indexed cache organization is employed for caches within the preferred embodiment. Cache lines are stored within the cache in congruence classes, sets of cache lines identified by a common index field within the system addresses for the cache lines in a congruence class.

Within an indexed cache organization, a portion of the system address for a cache line are treated as a tag, another portion of the system address is treated as the index, and the remaining bits are an intra-cache line address. The index field of the address is employed by the cache directory and the cache memory to locate congruence classes. The cache directory stores tags for cache lines contained within cache memory within the congruence class identified by the index, and compares the tag of a target address to the tags within the congruence class. If a match is identified, the corresponding cache line within cache memory is the target data.

In the prior art, the address for a data access operation and the address for a related cast out or deallocate operation are transmitted in separate system bus operations. However, within an indexed cache organization of the type described, the target data of a data access operation and the victim selected by the replacement policy are members of the same congruence class. Therefore the index field will be identical for both the data access and the cast out or deallocate operations. In the present invention, the index for the congruence class containing the target cache lines for both the data access and the cast out/deallocate ("Index") is combined with the tags for the cache line targeted by the data access ("Tag RD") and the cache line targeted by the cast out or deallocate ("Tag CO/DA").

The index and the two tags are then transmitted on the system bus in a single bus operation, which may require multiple bus cycles as shown. Fewer total bus cycles are required to transmit the combined index and tags, however, since the index need only be transmitted once. As illustrated in the example of FIG. 2, the directory state ("CO/DA State") of the cast out victim cache line—i.e., coherency state and/or LRU state—may also be appended to the address in the combined or merged bus operation. The combined response—to both the data access and the cast out operations—is driven two cycles after transmission of the cast out/deallocate victim state is complete as described in further detail below.

The combined operation of the present invention may be employed whenever the need to preserve some unique aspect of data arises, requiring a cast out operation for a related data access. Under the basic MESI coherency protocol, which includes the modified (M), exclusive (E), shared (S), and invalid (I) coherency states, a modified cache segment should be written to lower level storage when selected to be replaced. The modified state indicates that cache data has been modified with respect to corresponding data in system memory without also modifying the system memory data, such that the only valid copy of the data is within the cache entry storing the modified cache line or segment.

For exclusive, shared, or invalid cache segments, the cache segment selected for replacement need not be written to lower level storage since either (1) a valid copy already exists elsewhere in storage, or (2) the contents of the cache segment are invalid. The exclusive state indicates that the cache entry is consistent with system memory but is only found, within all caches at that level of the storage hierarchy, in the subject cache. The shared state indicates that the cache entry may be found in the subject cache as well as other caches at the same level in the storage hierarchy, with all copies of the data being consistent with the corresponding data in system memory. Finally, the invalid state indicates that a cache entry—both the data and the address tag—within a given cache entry is no longer coherent with either system memory or other caches in the storage hierarchy. However, in these instances a deallocate operation may be required as described below.

Coherency states implemented as extensions to the basic MESI protocol may also require a cast out, or elect to perform a cast out, and therefore benefit from the present invention. For example, the recent (R) state, essentially a variant of the shared state, indicates that the cache entry may be found in both the subject cache as well as other caches at the same level in the storage hierarchy, and that all copies of the data in the subject cache and other caches are consistent with the corresponding data in system memory, but also indicates that the subject cache, of all caches containing the shared data, most recently received the data in a system bus transaction such as a read from system memory. While a cast out is not necessary to preserve data integrity in such a case, a cast out operation may be useful to accurately maintain the recent state, and the combined address bus transaction of the present invention may be utilized for that purpose.

The combined operation of the present invention may also be employed whenever the need to communicate a deallocation is required; for instance, to permit a lower level, in-line and inclusive cache to update inclusivity information. Thus, when a cast out is not required for coherency when selecting a victim to make room for the target of a data access operation, a deallocate operation will frequently be required to update inclusivity information. The combined operation—with the same index and address tags but different opcodes—may be employed for both situation.

The combined operation of the present invention will save bus cycles over the dual operation scheme of the known art. If each index or tag requires a full bus cycle to completely transmit, the combined address of the present invention may be transmitted in three bus cycles (neglecting the optional state information), rather than four bus cycles as would be required for separate data access and cast out operations. The additional bus cycle is saved because the index field need only be transmitted once for both operations.

The resulting system bus transaction condenses, within a single address, the information required for both the data access operation and the related cast out. The combined index and tags may be transmitted in any predefined order, and may be transmitted on a single bus cycle or over multiple consecutive bus cycles as shown in FIG. 2. If the combined address is transmitted over multiple bus cycles, the index should be transmitted first to allow the receiving devices to begin a directory lookup at the earliest possible time. The tags may be transmitted during subsequent cycles and still be timely for the comparators employed to compared directory tags to the target tag(s). See commonly assigned, copending U.S. patent application Ser. No. 09/345,302 entitled "CACHE INDEX BASED SYSTEM ADDRESS BUS," incorporated herein by reference.

Figure 3:
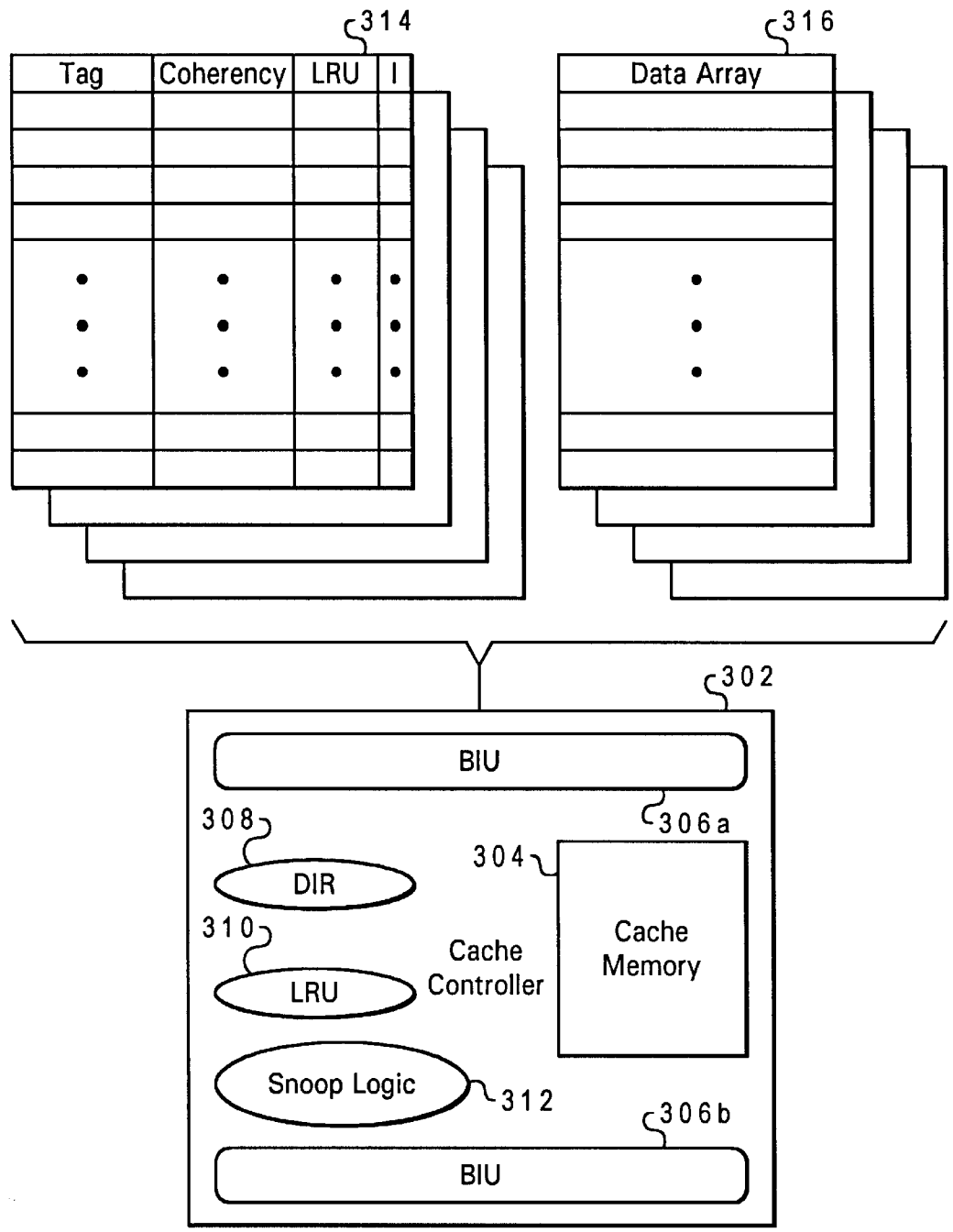
FIG. 3 depicts a diagram of a storage device which snoops and responds to the combined operation for related data access and cast out/deallocate operations in accordance with a preferred embodiment of the present invention.

With reference now to FIG. 3, a diagram of a storage device which snoops and responds to the combined operation for related data access and cast out/deallocate operations in accordance with a preferred embodiment of the present invention is depicted. The elements depicted are employed in L2 caches 108a–108l and in L3 caches 110a–110l. A cache controller 302 receives and transmits operations relating to data within cache memory 304 from upstream and downstream buses through bus interface units ("BIU") 306a and 306b. A directory lookup 308 is employed to locate cache lines within cache memory 304 and an LRU unit 310 implements the replacement policy for updating cache lines within cache memory 304. Snoop logic 312 detects operations initiated by a horizontal storage device (i.e., another L2 cache for L2 caches 108a–108l, and another L3 cache for L3 caches 110a–110l). Snoop logic 312 also controls the snoop response driven by the respective L2 cache in response to snooped operations.

The logical organization of data within the cache is in tables containing cache directory entries 314 and a corresponding data array 316. The cache directory entries 314 contain the address tag for the corresponding cache lines within data array 316, as well as the coherency state, the LRU status, and an inclusivity ("I") state for the respective cache line. The coherency state indicates the cache line consistency with other copies of the cache line in other storage devices within the system. The LRU status indicates the LRU position for the cache line within a congruence class. The inclusivity state indicates whether the cache line is stored within a logically in-line, higher level cache.

When a data access operation is received from a processor or higher level storage device, cache controller 302 may trigger the LRU 310 to select a victim, then look up the selected victim to determine if a cast out would be required to update the corresponding cache line and, if so, retrieve the tag for the current contents of the potential victim. This may be performed concurrently with the directory lookup and tag comparison employed to determine whether the received data access operation generates a cache hit or miss.

On the system bus side of the respective cache, when a combined operation for related data access and cast out/deallocate operations is detected by cache controller 302 on a lower level bus coupling the cache and horizontal caches to lower levels of the storage hierarchy, snoop logic 312 may access cache directory entries 314 for both the data access target and the cast out/deallocate victim to determine whether the target or victim are contained within data array 316 and, if so, to ascertain the coherency state and LRU position for the target and victim within the respective cache. Snoop logic 312 then drives a snoop response for the data access and cast out or deallocate operations to the combined response logic.

Figure 4:
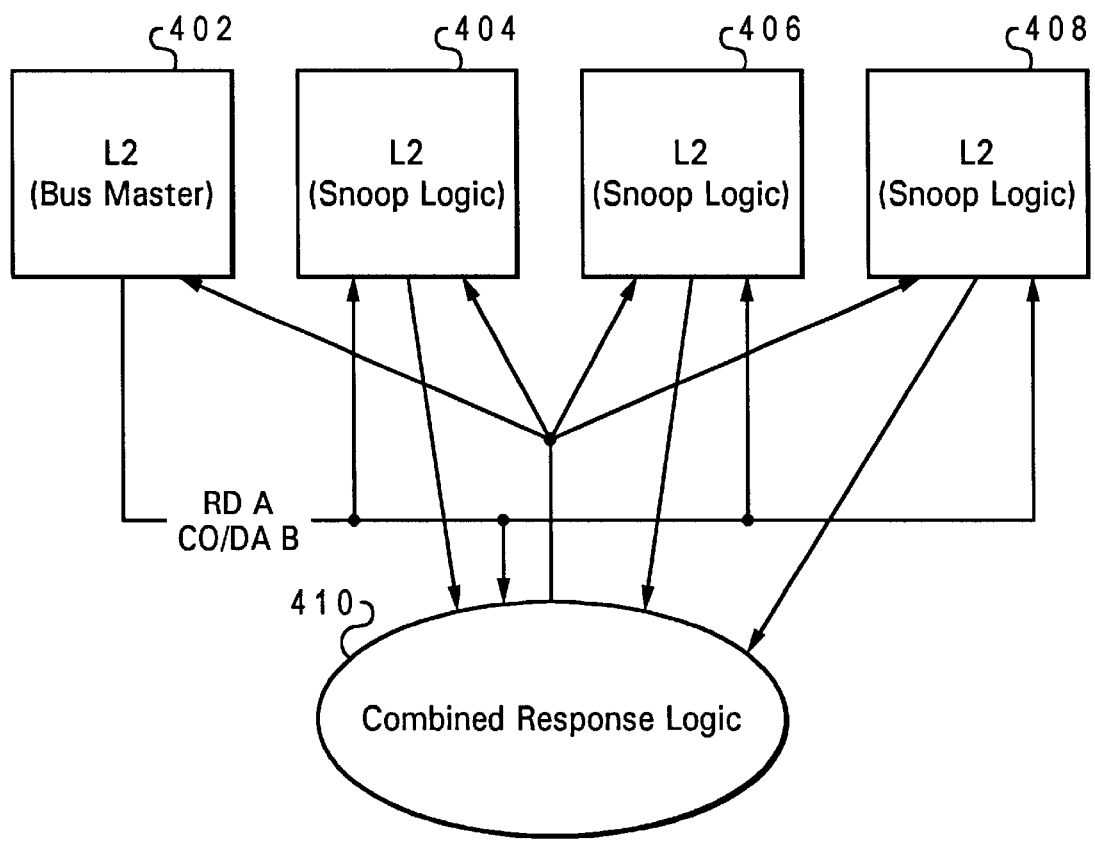
FIG. 4 is a diagram of a snoop response mechanism for a merged snoop response to a combined data access and cast out/deallocate operation in accordance with a preferred embodiment of the present invention.

Referring to FIG. 4, a diagram of a snoop response mechanism for a merged snoop response to a combined data access and cast out/deallocate operation in accordance with a preferred embodiment of the present invention is illustrated. The example selected for the purposes of describing the invention relates to L2 caches 108a–108l and system bus 112 depicted in FIG. 1.

In the exemplary embodiment shown for the present invention, an L2 cache receives a data access operation from an in-line processor which misses. A cast out or deallocate is required within L2 cache for replacement of an existing cache segment by the data access target. The bus interface logic 402 of the L2 cache therefore initiates (acting as a "bus master" after requesting and being granted the system bus) a combined data access and cast out/deallocate operation described above on the system bus. The combined data access operation requests a read of the cache line with the address A ("RD A") and a cast out or deallocate of the cache line with the address B ("CO/DA B").

The combined operation is detected by snoop logic 404, 406 and 408 within the remaining L2 caches coupled to the system bus, and is also received by combined response logic 410 (typically a part of the bus controller or the memory controller). Snoop logic 404, 406 and 408 checks the state of both the data access target and the cast out/deallocate victim within the respective L2 cache. For both the data access target and the cast out/deallocate victim, snoop logic 404, 406 and 408 determines whether the subject cache line is contained within the respective L2 cache and, if so, what coherency state and LRU position are associated with the subject cache line in the respective L2 cache. Of particular interest, as will be shown below, are the coherency state and LRU position of the cast out/deallocate victim. Snoop logic 404, 406 and 408 may also determine whether the respective L2 cache contains an invalid entry in the congruence class for the data access target and the cast out/deallocate victim.

Based on the presence or absence of the subject cache line and the coherency state of the subject cache line, snoop logic 404, 406 and 408 selects appropriate responses to the data access and cast out/deallocate operations. The responses selected may include a null response to either the data access or the cast out/deallocate, a retry for the data access or the cast out/deallocate, or an intervention for the data access.

The selected responses are "merged" by snoop logic 404, 406 and 408, which may actually merely entail selecting a single response representing both selected responses to the data access and cast out/deallocate operations. Snoop logic 404, 406 and 408 may also append the cache state for the cast out/deallocate victim—i.e., the coherency state, the LRU position, or both—to the merged response. Note that the "merged response" is the joint response of a single storage device to two related (and formerly discrete) data access and cast out/deallocate operations, which differs from the "combined response" of all storage devices coupled to a bus on which the operations are initiated. Snoop logic 404, 406 and 408 then drives merged response with any appended information to the combined response logic 410.

The merged response of the present invention to the data access and cast out/deallocate operations saves an additional bus cycle in completing the two operations. Furthermore, the availability of cache state information for the victim with the merged response allows improved data storage management to be performed either by snoop logic 404, 406 and 408 or combined response logic 410, or both.

As one example, if snoop logic 406 determines that the cast out/deallocate is a miss within the respective L2 cache, and that the congruence class includes an invalid entry within the respective L2 cache, this information may be appended to the merged data access and cast out/deallocate response to indicate that the respective L2 cache has space available. Rather than evicting or deallocating the cache line within the L2 cache initiating the combined data access and cast out/deallocate operation (the "bus master"), it may be preferable to store the target data within the L2 cache corresponding to snoop logic 406. These and other optimizations are possible with the merged response of the present invention.

Figure 5A:
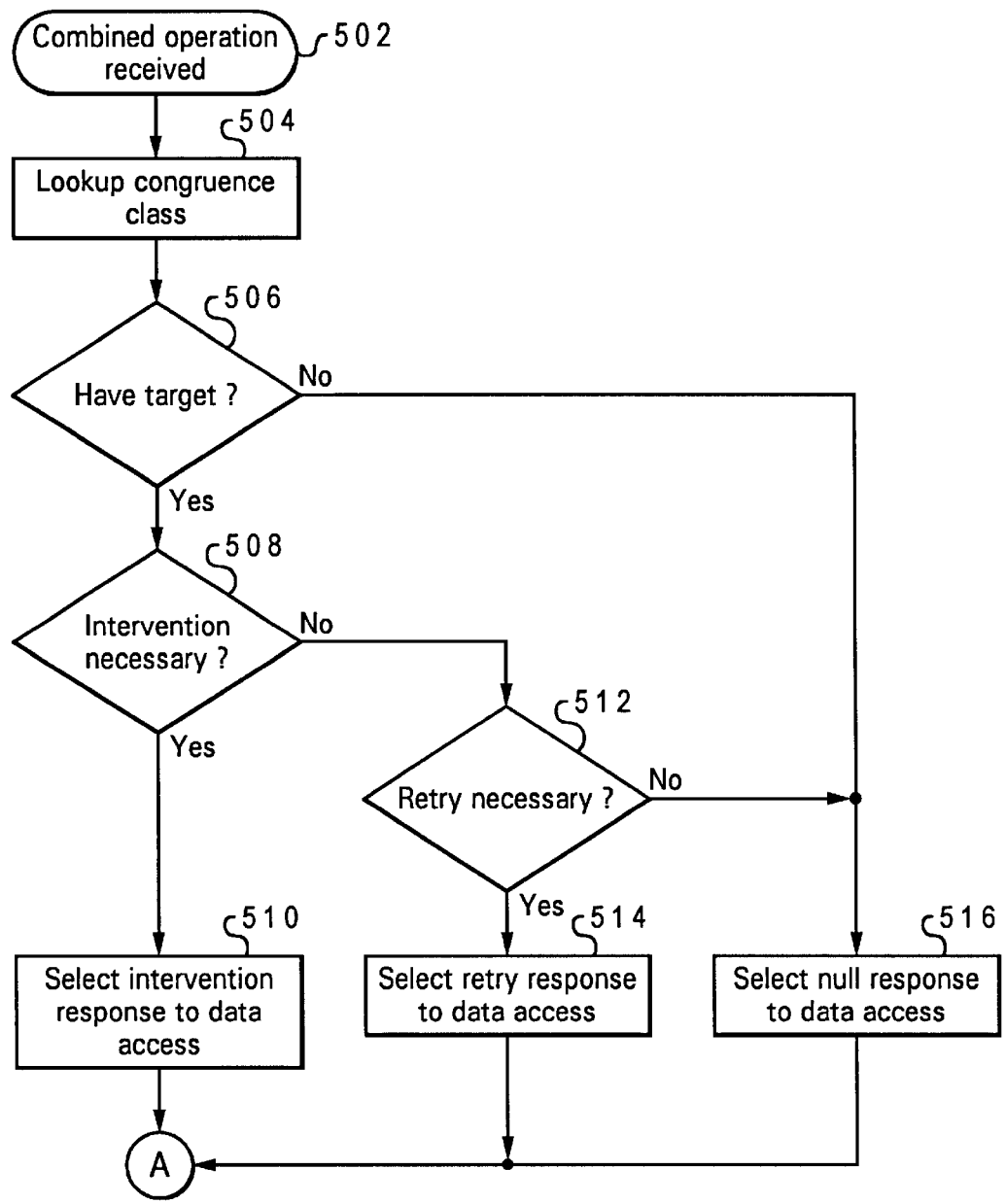
FIGS. 5A–5B depict a high level flowchart for a process of receiving and responding to a combined data access and cast out/deallocate operation in accordance with a preferred embodiment of the present invention.
Figure 5B:
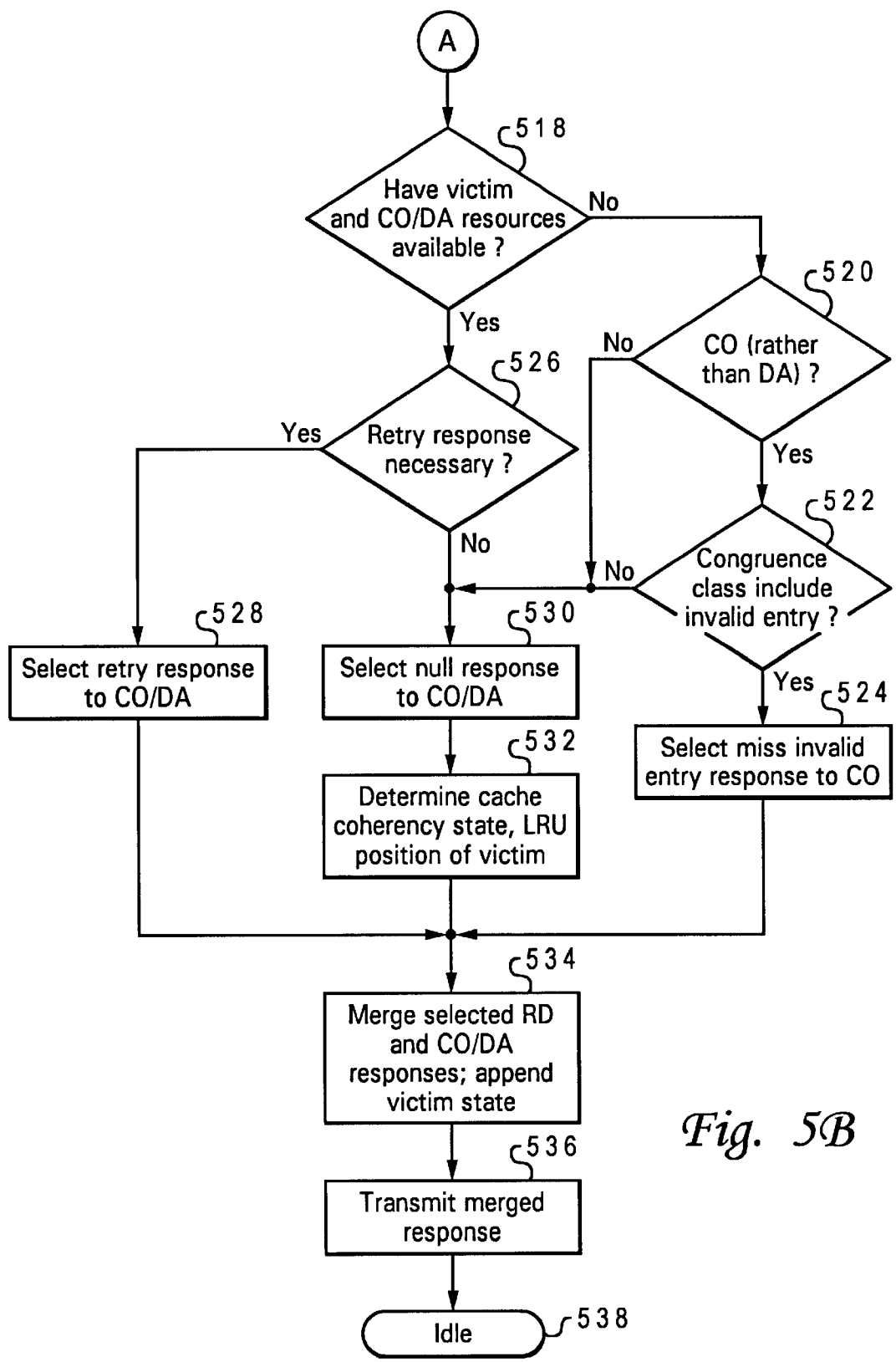

With reference now to FIGS. 5A and 5B, a high level flowchart for a process of receiving and responding to a combined data access and cast out/deallocate operation in accordance with a preferred embodiment of the present invention is depicted. The process is executed in a horizontal storage device coupled to the bus on which the originating storage device initiated the combined operation. The process begins at step 502, which depicts the combined operation being received.

The process next passes to step 504, which illustrates looking up the congruence class identified as containing the data access target and the cast out/deallocate victim. The process then passes to step 506, which depicts a determination as to whether the subject storage device contains the data access target. If so, the process proceeds to step 508, which illustrates a determination of whether an intervention is necessary, and whether intervention resources are available (i.e., intervention queue busy or available). An intervention by the subject storage device in the data access operation may be necessary where the subject storage device contains the data access target either (1) in an exclusive or modified coherency state, or (2) in a shared coherency state with the subject storage device having intervention responsibility.

If an intervention is necessary and intervention resources are available, the process proceeds to step 510, which depicts selection of an intervention response to the data access operation. Otherwise, however, the process proceeds instead to step 512, which illustrates a determination of whether a retry is necessary. A retry may be necessary, for instance, if the subject storage device is currently processing an operation from an in-line processor relating to the data access target, such that data integrity may be violated if the data access operation is permitted to proceed before the other operation is complete.

If a retry is determined to be necessary, the process proceeds to step 514, which depicts selecting a retry response to the data access operation. Otherwise, if the subject storage device does not contain the data access target or if neither an intervention nor a retry are required, the process proceeds instead from step 506 to step 516, which illustrates selecting a null response code. From any of steps 510, 514, or 516, the process then passes to step 518 depicted in FIG. 5B.

Step 518 depicts a determination by the subject storage device (snooper) of whether it contains a cache line corresponding to the selected victim, and whether cast out or deallocate resources are available. If not, the process proceeds to step 520, which illustrates a determination of whether the selected victim is being evicted, as opposed to merely deallocated, which may be determined from the opcode for the combined operation received by the subject storage device. If the victim is being cast out, the process then proceeds to step 522, which depicts a determination of whether the congruence class for the data access target and the cast out victim includes an invalid entry. If so, the process proceeds to step 524, which illustrates selecting a miss with invalid entry response code to the cast out operation.

Referring back to step 518, if the subject storage device contains the selected victim and cast out or deallocate resources are available, the process proceeds instead to step 526, which depicts a determination of whether a retry response is necessary. If so, the process proceeds to step 528, which illustrates selecting a retry response code to the cast out/deallocate operation. However, if a retry response is not necessary, or if the subject storage device does not contain the selected victim and a deallocate is being performed rather than a cast out (step 520), or if the subject storage device does not contain the cast out victim and does not have an invalid entry within the congruence class for the cast out victim (step 522), the process proceeds instead to step 530, which depicts selecting a null response code to the cast out/deallocate operation. The process next passes to step 532, which illustrates determining the cache coherency state and the LRU position of the selected victim.

From any of steps 524, 528 or 532, the process then passes to step 534, which depicts "merging" the selected data access and cast out/deallocate operation response codes. In practice, the "merger" of the two response codes may actually be simply selection of a single response code defined as incorporating both selected responses to the data access and cast out/deallocate operations. The victim coherency state and LRU position may also be appended to the merged response code.

The process passes next to step 536, which illustrates transmitting the merged response code, with any appended information, to the combined response logic for combination with the response codes driven by other snoopers. The process then passes to step 538, which depicts the process becoming idle until another combined data access and cast out/deallocate operation is received by the subject storage device.

While the invention has been particularly shown and described with reference to a preferred embodiment, it will be understood by those skilled in the art that various changes in form and detail may be made therein without departing from the spirit and scope of the invention.

What is claimed is:

1. A method of data storage management, comprising:
   detecting an operation for a data access and related replacement of a cache segment within a first horizontal storage device;
   in response to detecting the operation, determining a cache state for a target of the data access and a victim of the replacement in a second horizontal storage device; and
   driving a merged snoop response to the detected operation.

2. The method of claim 1, wherein the step of detecting an operation for a data access and related replacement of a cache segment within a horizontal storage device further comprises:

snooping the operation on a bus coupled to the first horizontal storage device.

3. The method of claim 1, wherein the step of determining a cache state for a target of the data access and a victim of the replacement further comprises:

looking up a congruence class for the data access target and the replacement victim;

determining a coherency state for the data access target; and determining a coherency state for the replacement victim.

4. The method of claim 3, wherein the step of determining a cache state for a target of the data access and a victim of the replacement further comprises:

determining an LRU position for the replacement victim.

5. The method of claim 4, wherein the step of driving a merged snoop response to the detected operation further comprises:

appending the coherency state and the LRU position for the replacement victim to the merged snoop response.

6. The method of claim 3, further comprising:

determining whether the congruence class for the data access target and the replacement victim contains an invalid entry.

7. The method of claim 1, further comprising:

determining whether an intervention response to the data access is required;

determining whether a retry response to the data access is required; and determining whether a retry response to the replacement is required.

8. The method of claim 1, further comprising:

determining an appropriate response to the data access;

determining an appropriate response to the replacement;

selecting a response code incorporating the response to the data access and the response to the replacement; and driving the selected response code as the merged response.

9. A system for data storage management, comprising:

a storage device; and snoop logic for the storage device detecting an operation for a data access and related replacement of a cache segment within a horizontal storage device, wherein the snoop logic determines a cache state within the storage device for both a target of the data access and a victim of the replacement and drives a merged snoop response to the detected operation based on the cache state for the target and for the victim.

10. The system of claim 9, wherein the snoop logic snoops the operation on a bus coupling the storage device to the horizontal storage device.

11. The system of claim 9, wherein the snoop logic:

looks up a congruence class for the data access target and the replacement victim;

determines a coherency state for the data access target; and determines a coherency state for the replacement victim.

12. The system of claim 11, wherein the snoop logic determines an LRU position for the replacement victim.

13. The system of claim 12, wherein the snoop logic appends the coherency state and the LRU position for the replacement victim to the merged snoop response.

14. The system of claim 11, wherein the snoop logic determines whether the congruence class within the storage device for the data access target and the replacement victim contains an invalid entry.

15. The system of claim 9, wherein the snoop logic:

determines whether an intervention response to the data access is required;

determines whether a retry response to the data access is required; and determines whether a retry response to the replacement is required.

16. The system of claim 9, wherein the snoop logic:

determines an appropriate response to the data access;

determines an appropriate response to the replacement;

selects a response code incorporating the response to the data access and the response to the replacement; and drives the selected response code as the merged response.

17. The system of claim 9, further comprising:

a processor initiating the data access, wherein the horizontal storage device initiates the replacement in response to the data access;

a system memory coupled to the storage device and containing a target of the data access.

18. A method of responding to a combined data access and cast out/deallocate operation, comprising:

snooping the combined operation at a storage device;

determining whether a target of a data access portion of the combined operation is contained within the storage device;

responsive to determining that the target is contained within the storage device, determining a coherency state for the target;

selecting a response for the data access portion of the combined operation based upon whether the target is contained within the storage device and the coherency state for the target;

determining whether a victim of a cast out/deallocate portion of the combined operation is contained within the storage device;

responsive to determining that the victim is contained within the storage device, determining a coherency state for the victim;

selecting a response for the cast out/deallocate portion of the combined operation based upon whether the victim is contained within the storage device and the coherency state for the victim;

selecting a response code containing the selected response for the data access portion of the combined operation and the selected response for the cast out/deallocate portion of the combined operation; and driving the selecting response code in response to the combined operation.

19. The method of claim 18, wherein the step of driving the selecting response code in response to the combined operation further comprises:

appending the coherency state of the victim to the selected response code.

20. The method of claim 18, wherein the step of driving the selecting response code in response to the combined operation further comprises:

driving the selected response code to combined response logic receiving responses from all storage devices snooping the combined operation and combining the received responses.

21. The method of claim 18, further comprising:

determining an LRU position of the victim within the storage device; and appending the LRU position of the victim to the selected response code.

* * * * *